US009641809B2

(12) United States Patent
Staudenmaier et al.

(10) Patent No.: US 9,641,809 B2
(45) Date of Patent: May 2, 2017

(54) CIRCUIT ARRANGEMENT AND METHOD FOR PROCESSING A DIGITAL VIDEO STREAM AND FOR DETECTING A FAULT IN A DIGITAL VIDEO STREAM, DIGITAL VIDEO SYSTEM AND COMPUTER READABLE PROGRAM PRODUCT

(71) Applicants: Michael Andreas Staudenmaier, Munich (DE); Victor-Hugo Osornio Lopez, Zapopan (MX); Dirk Wendel, Grasbrunn (DE)

(72) Inventors: Michael Andreas Staudenmaier, Munich (DE); Victor-Hugo Osornio Lopez, Zapopan (MX); Dirk Wendel, Grasbrunn (DE)

(73) Assignee: NXP USA, Inc., Austin, TX (US)

( * ) Notice: Subject to any disclaimer, the term of this patent is extended or adjusted under 35 U.S.C. 154(b) by 257 days.

(21) Appl. No.: 14/224,167

(22) Filed: Mar. 25, 2014

(65) Prior Publication Data
US 2015/0281742 A1   Oct. 1, 2015

(51) Int. Cl.
*H04N 19/65*   (2014.01)
*H04N 7/18*   (2006.01)
*H04N 19/89*   (2014.01)

(52) U.S. Cl.
CPC ............ *H04N 7/183* (2013.01); *H04N 19/89* (2014.11)

(58) Field of Classification Search
CPC ............................... H04N 21/00; H04N 7/183
(Continued)

(56) References Cited

U.S. PATENT DOCUMENTS 6,201,834 B1 *  3/2001  Zhu ................... H04N 21/2381
                                          375/240.27
6,377,297 B1     4/2002  Janko et al.
(Continued)

FOREIGN PATENT DOCUMENTS

JP   2002290998 A   10/2002
JP   2004242223 A    8/2004
JP   2009130436 A    6/2009

OTHER PUBLICATIONS

Chauhan et al, Hybrid Approach for Video Compression Based on Scene Change Detection, 2013.*
(Continued)

*Primary Examiner* — Shan Elahi

(57) ABSTRACT

The present invention relates to a circuit arrangement for processing a digital video stream, the circuit arrangement comprising: an input interface for receiving a digital video stream, a processing circuit which is arranged to process the digital video stream, a hang-up detecting circuit for detecting a fault in the processed digital video stream, the hang-up detecting circuit comprising: a checksum generating circuit which is arranged to generate checksums for the frames of the processed digital video stream, a memory for storing generated checksums and an analyzing device arranged to compare a currently generated checksum to a plurality of corresponding checksums of preceding frames stored in the memory and to generate an error signal if at least one predefined amount of compared checksums are matching. The present invention also relates to a digital video system, a method for processing a digital video stream and a computer readable program product.

20 Claims, 5 Drawing Sheets

(58) Field of Classification Search
USPC .................................................. 375/240.27
See application file for complete search history.

(56) References Cited

U.S. PATENT DOCUMENTS

| | | | |
|---|---|---|---|
| 6,564,000 B2 | 5/2003 | Shimura | |
| 6,633,329 B2 | 10/2003 | Janko et al. | |
| 7,929,796 B2 | 4/2011 | Funayama | |
| 8,249,363 B2 | 8/2012 | Lee et al. | |
| 2001/0034866 A1* | 10/2001 | Barry | G01R 31/31813 714/734 |
| 2004/0143710 A1* | 7/2004 | Walmsley | B41J 2/04505 711/144 |
| 2004/0194001 A1* | 9/2004 | Ting | H04L 1/00 714/776 |
| 2005/0125733 A1* | 6/2005 | Aleksic | H04L 29/06 715/716 |
| 2006/0026363 A1* | 2/2006 | Yamazaki | G06F 9/3802 711/133 |
| 2006/0120390 A1* | 6/2006 | Habben | H04L 12/403 370/406 |
| 2006/0234202 A1* | 10/2006 | Brown | A61B 5/044 434/323 |
| 2006/0251115 A1* | 11/2006 | Haque | H04B 7/2606 370/466 |
| 2007/0030933 A1* | 2/2007 | Galluscio | H04L 1/0006 375/354 |
| 2007/0040033 A1 | 2/2007 | Rosenberg | |
| 2008/0005649 A1* | 1/2008 | Feeney | H03M 13/2909 714/785 |
| 2008/0052569 A1* | 2/2008 | Ngo | G06F 11/1004 714/718 |
| 2008/0086749 A1* | 4/2008 | Goldberg | H04L 12/2838 725/68 |
| 2008/0126882 A1* | 5/2008 | Fulton | G05B 19/058 714/48 |
| 2008/0310516 A1* | 12/2008 | Kobayashi | H04N 19/172 375/240.24 |
| 2009/0028238 A1 | 1/2009 | Collomosse et al. | |
| 2009/0041115 A1* | 2/2009 | Ramesh | H04N 21/235 375/240.01 |
| 2009/0147861 A1* | 6/2009 | Schnebly | G06T 1/0085 375/240.27 |
| 2009/0181628 A1* | 7/2009 | Feder | H04L 5/0023 455/127.1 |
| 2009/0268816 A1* | 10/2009 | Pandit | H04N 19/597 375/240.12 |
| 2010/0225767 A1 | 9/2010 | Ferguson | |
| 2013/0100152 A1 | 4/2013 | Feng et al. | |
| 2013/0128022 A1* | 5/2013 | Bose | H04N 7/18 348/77 |
| 2014/0192866 A1 | 7/2014 | Cohen et al. | |
| 2014/0198838 A1 | 7/2014 | Andrysco et al. | |
| 2014/0294126 A1 | 10/2014 | Rege et al. | |
| 2014/0321640 A1* | 10/2014 | Johne | H04N 1/00339 380/28 |

OTHER PUBLICATIONS

Thaipanich et al, Low Complexity Algorithm for Robust Video Frame Rate Up-Conversion (FRUC) Technique, 2009.*
Microsoft, "Timeout Detection and Recovery (TDR)," downloaded from <<http://msdn.microsoft.com/en-us/library/windows/hardware/ff570087(v=vs.85).aspx>> on Jun. 14, 2014; 1 page.
Tektronix; "Black and Frozen Frame Detection," How to Guide; WFM6120/7020/7120 & WVR6020/7020/7120; Version 5.0.2 Software; downloaded from <<www.tek.com/dl/2PW-24654-0.pdf>> on Jun. 14, 2014; 12 pages.
U.S. Appl. No. 14/445,718, filed Jul. 29, 2014, entitled "Method and Video System fo Freeze-Frame Detection".

* cited by examiner

CIRCUIT ARRANGEMENT AND METHOD FOR PROCESSING A DIGITAL VIDEO STREAM AND FOR DETECTING A FAULT IN A DIGITAL VIDEO STREAM, DIGITAL VIDEO SYSTEM AND COMPUTER READABLE PROGRAM PRODUCT

FIELD OF THE INVENTION

The present invention relates to a circuit arrangement for processing a digital information, and in particular to processing digital video stream information.

BACKGROUND OF THE INVENTION

Digital video systems are widely used in safety-critical applications such as motorized vehicles, airplanes, and industrial equipment. Video applications are for example used in complex multi-media infotainment systems, navigation systems, instrument clusters and camera based systems, such as rear view cameras.

Digital video systems generally communicate a sequence of digital images from a source, such as a camera, to a destination, such as a display or screen. The digital images are provided in a frame based format using a so called digital video stream which provides a stream, or sequence, of frames, each frame representing a respective image. The communication can be made directly from the camera to a live display or the communication can be time delayed by storing the video into a memory, such as a DDR-DRAM (double data rate DRAM) and displaying in at a later time. Here, usually one or more image memories are used in order to store the digital video streams into the memory. Additionally the digital video stream may be processed in while it is forwarded to the destination.

Various system failures within a digital video system may cause the digital video stream to stop or to lock-up, resulting in a so-called frame freeze or hang-up condition. Examples of such failures may be hardware based or software based, such as a camera lock-up, electronics lock-up, a fault in the communication path when the digital video stream is processed, memory failure when the digital video stream is buffered, a faulty interrupt, repeated frames, skipped frames, or the like. Especially, for safety critical applications it is important for a user or operator to know quickly that the digital video stream has failed, e.g. to realized that the vehicle speed indicated is not correct or that despite the image from the rear view camera not changing the vehicle is actually moving.

Various solutions are known from the prior art to detect frame freeze. One approach is for example described in United States patent application publication US 2009/0147861. This '861 publication discloses a detection of faults in a digital video stream which employs a code verification process that inserts a kind of a marker into the digital video stream. For this purpose, a code generating circuit is used to place a predefined code into each frame of the received digital video stream. The code changes in a predefined manner from one frame to the next and is embedded into one or more pixels of each frame of the digital video stream. Verification at the destination (display) of the changing code within the frame of the video stream can be employed to confirm that the digital video stream is not in a frame freeze condition or another fault condition prior to displaying the digital video stream at the display. If for example a fault condition is detected by this kind of code verification process, an operator can be made aware of this fault.

However, the method as described in US 2009/0147861 A1 does not work properly in systems where the digital video streams are more or less heavily processed and modified before they are displayed at the destination. For example, in a digital video system with different applications which each provide a digital video stream and the different digital video streams have to be combined into one single digital video stream, the code included into the digital video stream will be either processed or modified and accordingly the reliability affected.

SUMMARY OF THE INVENTION

The present invention provides a circuit arrangement for processing a digital video stream and for detecting a fault in the digital video stream, a digital video system, a method for processing a digital video stream and for detecting a fault in the processed digital video stream and a computer readable program product, as described in the appended claims.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

In the figures of the drawings elements, features and signals which are the same or at least have the same functionality have been provided with the same reference symbols, unless explicitly stated otherwise.

DETAILED DESCRIPTION OF THE EMBODIMENTS

Figure 1:
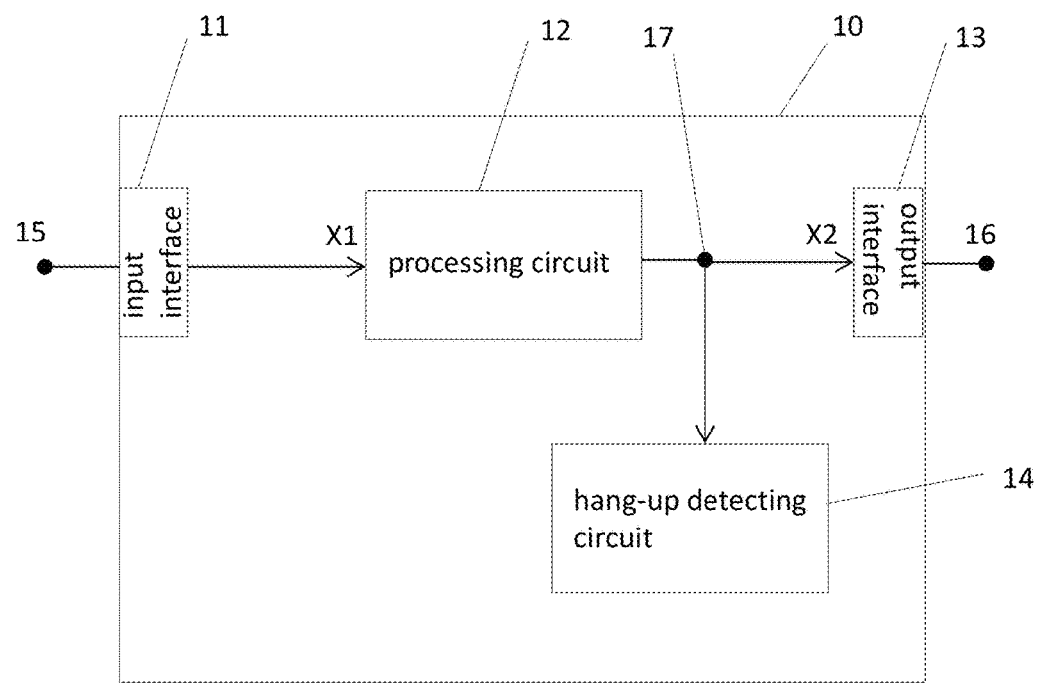
FIG. 1 schematically shows a block diagram of an example of a circuit arrangement.

According to a first aspect of the invention, a circuit arrangement for processing a digital video stream and for detecting a fault in the processed digital video stream, the circuit arrangement comprising: an input interface for receiving a digital video stream, the digital video stream comprises information of a sequence of frames; a processing circuit which can be arranged to process the digital video stream and to provide the processed digital video stream to an output interface; a hang-up detecting circuit for detecting a fault in the processed digital video stream, the hang-up detecting circuit comprising: a checksum generating circuit which can be arranged to generate at least one checksum for at least a part of a frame of the sequence, for each of multiple frames out of the sequence, a memory for storing at least a predefined amount of generated checksums and an analyzing unit which can be arranged to compare a currently generated checksum of a current frame of the processed digital video stream with a plurality of corresponding checksums of preceding frames stored in the memory and to generate an error signal if at least one predefined amount of compared checksums are matching.

According to a second aspect of the invention, a digital video system is provided, in particular an automotive video system, comprising: a circuit arrangement according to the first aspect of the invention, a video signal generating circuit which is coupled to the circuit arrangement and which can be arranged to provide a digital video stream to the input interface of the circuit arrangement, a display device which is coupled to an output interface of the circuit arrangement and which can be arranged to display the digital video stream processed by the circuit arrangement.

Further, according to a third aspect of the invention, a method for processing a digital video stream and for detecting a fault in the processed digital video stream, the method comprising: processing a digital video stream wherein the digital video stream comprising information of an image; iteratively detecting a fault for each frame of the processed digital video stream, detecting comprising: generating at least one checksum for at least a part of a frame of the digital video stream, storing at least a predefined amount of generated checksums in a memory, comparing a currently generated checksum of a current frame of the processed digital video stream with a plurality of corresponding checksums of preceding frames of the same processed digital video stream stored in the memory, generating an error signal if at least one predefined amount of compared checksums are matching.

Finally, according to a fourth aspect of the invention, a computer readable program product, comprises instructions which, when executed on a programmable apparatus, cause the programmable apparatus to perform a method according to the third aspect of the invention.

It is a finding of the present invention that modern digital video systems may employ different signal sources such as conventional cameras or microprocessors which calculate a digital video stream using a given program. It is a further finding of the present invention that the digital video stream is more or less processed prior to be displayed on a screen. The present invention addresses these findings by providing a circuit arrangement and a method which are capable to detect faults within digital video streams which are processed, such as image freezes and hang-up and which are thus able to ensure that images presented on a display or screen are updated appropriately.

According to an embodiment of the present invention a checksum based approach is proposed where it is checked whether the checksum of a current displayed image or part of it does not match with some previous images respectively. For this purpose the circuit arrangement comprises a special hang-up detecting circuit. This hang-up detecting circuit comprises a checksum generating circuit, a memory and an analysing unit.

The checksum generating circuit can be arranged to generate a checksum over an image, or part of it. Preferably, this can be done by using CRC. CRC stands for cyclic redundancy check and denotes an error-detecting code commonly used in digital networks and storage devices to detect accidental changes to raw data. With CRC, blocks of data entering the corresponding computer systems get a short check value (the so-called checksum) attached, based on the remainder of a polynomial division of their contents: On retrieval the calculation is repeated, and corrective action can be taken against presumed data corruption if the check values do not match. CRCs are simple to implement in binary hardware, easy to analyse mathematically, and particularly good for detecting common errors caused by noise or the like in a transmission path. The CRC checksum or check value typically has a fixed length. As an alternative it is also possible to generate the checksum by employing a suitable hash function.

The generated checksums are stored in a specific memory such as a checksum memory stack. This kind of memory stack is designed to store at least a predefined amount of generated checksums of the last n frames of the digital video stream. Here, n should preferably match at least the minimum number of stored image frames of the processed digital video stream in the data path. In case n is smaller than the minimum number of stored image frames of the process digital video stream in the data path, checksums may not match with previous images and a fault thus may not be detected. The memory may be any kind of a memory such as a conventional DRAM, SRAM, register and the like. Typically, the memory can be arranged in a FIFO style (i.e. first in, first out)

The hang-up detecting circuit further comprises an analysing unit which in turn typically comprises a hang-up counter and a decider device. The hang-up counter provides an information of the amount of images which are shown multiple times, i.e. which are not updated. This may be a kind of fuzzy logic approach which prevents the circuit arrangement from triggering an error in the case that the incoming digital video stream is in fact identical from frame to frame without having an error or in the rare case that two or more generated checksums are identical for different images. The decider which analyses the counter value of the hang-up counter decides whether the circuit arrangement is actually in an error state or not and generates a corresponding error signal. Preferably, the decider device employs an additional threshold in order to accommodate identical checksums which were generated by accident as described above where actually there exists no error.

The present invention requires only little logic circuitry and is thus very efficiently to implement, but nevertheless very efficient in detecting a failure.

In particular, the solution according to the present invention allows transmitting updated camera images to the display of the user without the need for encoding the corresponding video information. This is in particular important and advantageous for safety critical applications where there is the need not to manipulate or affect the processed digital video stream. The solution according to the present invention performs a consistency check for the last n frames of the processed digital data stream without affecting the content of this digital data stream, whereas n should preferably match at least the minimum number of stored image frames of the processed digital video stream in the data path.

Specific embodiments of the invention are set forth in the dependent claims.

In one embodiment the hang-up detecting circuit can comprise a tap-input which is connected to the input interface and wherein the tap input is further arranged to tap the digital video stream at the input interface in order to detect a fault in the unprocessed digital video stream.

In another embodiment the checksum generating circuit can be arranged to generate a CRC checksum.

In another embodiment the checksum generating circuit is arranged to generate a plurality of checksums per frame of the digital video stream, in particular at least four checksums.

In another embodiment the analysing unit comprises a hang-up counter and a decider, wherein the hang-up counter is arranged to identify the amount of checksums which are matching and wherein the decider is arranged to generate the error signal only if a predefined amount of matched checksums are subsequently identified.

In another embodiment the analysing unit can comprise a hang-up counter and a decider, wherein the hang-up counter is arranged to identify a failure in the digital video stream based on the ratio between the number of non-identical checksums and the number of identical checksums and wherein the decider is arranged to generate the error signal only if the ratio exceeds a predefined ratio.

In another embodiment the analysing unit can be coupled with the input interface and can be arranged such to perform a slight modification of the unprocessed digital video signal if at least one two compared checksums are matching and/or if an error is detected.

In another embodiment the circuit arrangement further can comprise an interrupting device which is coupled to the analysing unit in order to receive the error signal and which is arranged to interrupt the functionality of an external video signal generating circuit, the input interface, the processing device and/or the output interface if an error signal is provided to the interrupting device.

In another embodiment the memory can be arranged to store at least one checksum per stored image frame of the generated digital video stream.

In another embodiment the video system further can comprise an optical and/or acoustical error displaying device which can be coupled to an error output terminal of the circuit arrangement and which based on the error signal is arranged to optically and/or acoustically indicate an error condition.

In another embodiment the video signal generating circuit can be a camera.

In another embodiment the video signal generating circuit can be a calculation circuit which can be arranged to calculate the digital video stream based on a predefined program and/or video data.

In another embodiment the method can further comprise slightly modifying the unprocessed digital video stream if at least one pair of compared checksums is matching.

In another embodiment the method can further comprise interrupting the functionality of a video signal generating circuit, an input interface, a processing device and/or an output interface if an error signal is generated.

In another embodiment subsequently generating can comprise the generation of a plurality of checksums per frame of the processed digital video stream.

In another embodiment the error signal can be generated only if a predefined amount of matched checksums are straight successively identified.

These and other aspects of the invention will be apparent from and elucidated with reference to the embodiments described hereinafter.

FIG. 1 schematically shows a block diagram of an example of a circuit arrangement 10. The circuit arrangement 10 may be used as a component in an automotive video processing circuit, such as an advanced driver assistance system (ADAS), and is designed for processing a digital video stream and for detecting a fault in the digital video stream, such as an image hang-up. The circuit arrangement 10 comprises an input interface 11, a processing circuit 12, an output interface 13 and a hang-up detecting circuit 14.

The input interface 11 is constructed such to receive and forward a digital video stream X1 to a processing circuit 12.

For this purpose the input interface 11 can comprise in one embodiment an input terminal 15 for coupling the circuit arrangement 10 with an external video signal generating circuit (not shown). However, in another embodiment it may also be possible that the digital video stream X1 is generated internally in the circuit arrangement 10 by an internal video signal generating circuit, for example by a computational unit within the circuit arrangement 10 (not shown). In one embodiment the digital video stream X1 contains information of a sequence of frames of the digital video stream.

An "image" is a two dimensional representation of a scene to be displayed. Furthermore a "frame" is a two-dimensional matrix of pixels for an image. Hereinafter, the words "image" and "picture" can be used synonymously. Images may be two-dimensional, such as a photograph, screen display, or three-dimensional, such as a statue or hologram. They may be captured by optical devices such as cameras, mirrors, lenses, telescopes, etc. or are generated by a computational device such as a processor using a given program. The later one may be a navigation system which computes the location of an object based on GPS data, a digital tachometer that displays the sensed speed on a screen, etc. The word image is also used in the broader sense of any two-dimensional figure such as a map, a graph, a pie chart, or the like. In this wider sense, images can also be rendered manually. Images may be non-volatile (i.e. static) or volatile which are existing only for a short period of time.

The input interface 11 can be operatively coupled to the processing circuit 12 which can be arranged downstream the communication path. This processing circuit 12 can be arranged to process the digital video stream X1 and to provide a processed digital video stream X2 to an output interface 13.

"Processed" in the context of this application denotes any kind of modification, manipulation, etc. of the digital data of the digital video stream X1 such that the digital data of the processed digital video stream X2 is at least partial different to the unprocessed digital video stream X1. For this purpose, circuit arrangement 10 can be an integrated circuit, a microprocessor, such as a general purpose microprocessor, a microcontroller, a digital signal processor or other type of circuit arrangement comprising one or more central processing units (and optionally peripherals like co-processors, etc). Furthermore, the processing circuit 12 can e.g. be a video accelerator, a video co-processor, a GPU or other suitable logic circuit.

At an output terminal 16 of the output interface 13, the processed digital video stream X2 may be tapped, e.g. by any kind of display device (not shown in FIG. 1), such as a screen, monitor, display or the like.

The processed digital video stream X2 may also be tapped from a tap 17 between the processing circuit 12 and the output interface 13 and forwarded to the hang-up detecting circuit 14.

The hang-up detecting circuit can be implemented in any manner suitable for the specific implementation, and may be arranged to detect a fault in the processed digital video stream X2. The structure and functionality of the detecting circuit 14 will be described in more detail with reference to the examples of FIGS. 2 and 3.

Figure 2:
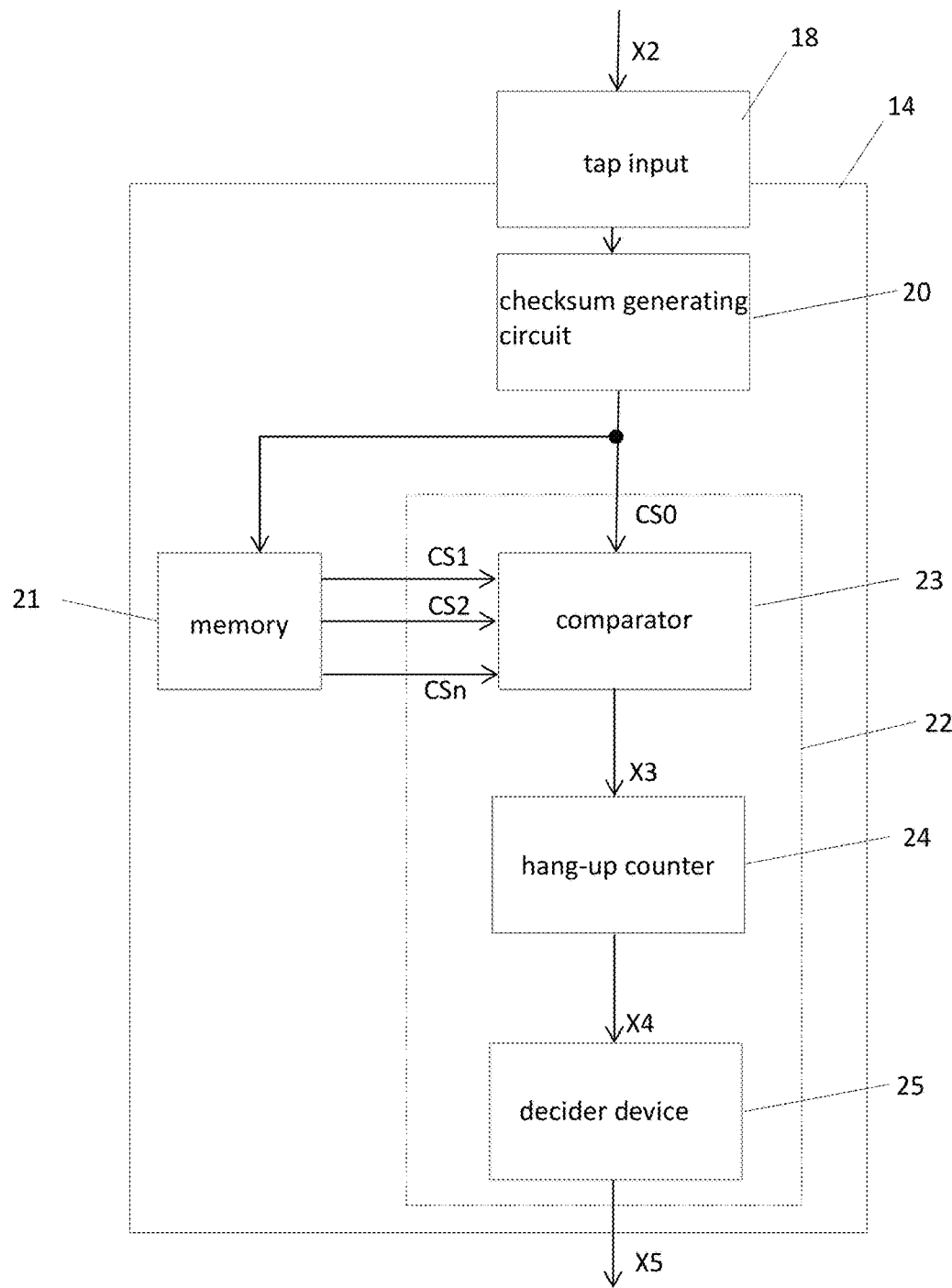
FIG. 2 schematically shows a block diagram of an example of a hang-up detecting circuit suitable for the example of FIG. 1.

FIG. 2 schematically shows a block diagram of an example of the hang-up detecting circuit 14 suitable for the example of FIG. 1. The hang-up detecting circuit 14 comprises a tap input 18, a checksum generating circuit 20, a memory 21, such as a stack memory 21, and an analysing unit 22. The checksum generating circuit 20 can be arranged to generate one or more checksums CS0 for at least a part of a frame of the processed digital video stream X2.

The checksum generating circuit 20 can be implemented in any manner suitable for the specific implementation. For example, the checksum generating circuit 20 can be arranged to generate a CRC checksum or other error detection code.

The checksum generating circuit 20 can be arranged to generate a single checksum or a plurality of checksums per frame of the digital video stream X2, for example at least four checksums per frame.

When a newly generated checksum CS0 is stored in the memory 21, typically the oldest checksum CSn will be deleted from the memory 21.

The analysing unit 22 can compare a currently generated checksum CS0 of a current frame of the processed digital video stream X2 with a plurality of corresponding checksums CS1-CSn of preceding frames stored in the memory 21 and to generate an error signal X5 if at least one predefined amount of compared checksums are matching.

The analysing unit 22 may be implemented in any manner suitable for the specific implementation. As shown in FIG. 2, the analysing unit 22 may e.g. comprise a comparing unit 23, a hang-up counter 24 and a decider device 25. The comparing unit 23 can compare a currently generated checksum CS0 of a current frame of the processed digital video stream X2 with a plurality of previous checksums CS1-CSn, stored in the stack memory 21, of preceding frames of the same processed digital video stream X2.

The comparing unit 23 may be a comparator 22 which provides at its output a signal that conveyes information X3 about whether the currently generated checksum CS0 is identical to a previous checksum CS1-CSn. This information X3 is the provided to the subsequent hang-up counter 24.

The hang-up counter 24 provides a counter value X4 which contains information of the amount of images which are shown multiple times and which are thus probably not updated. The decider device 25 finally analyses the counter value X4 of the hang-up counter 24 and decides whether the circuit arrangement 10 is actually in an error state. Depending of this decision the decider device 25 generates a corresponding error signal X5. Typically, the decider device 25 employs a threshold in order to prevent that an error signal X5 is generated although no error case exists.

In one particular embodiment, the hang-up counter 24 can be arranged to identify a failure in the digital video stream X2. The failure detection can be made in the hang-up counter 24 by calculating a ratio between the number of non-identical checksums and the number of identical checksums. "Identical checksum" denotes the situation where two compared checksums are matching and "non-identical checksum" denotes the situation where two compared checksums are not matching. Then, the decider 25 can be arranged to generate the error signal X5 only if the calculated ratio exceeds a predefined ratio.

Figure 3:
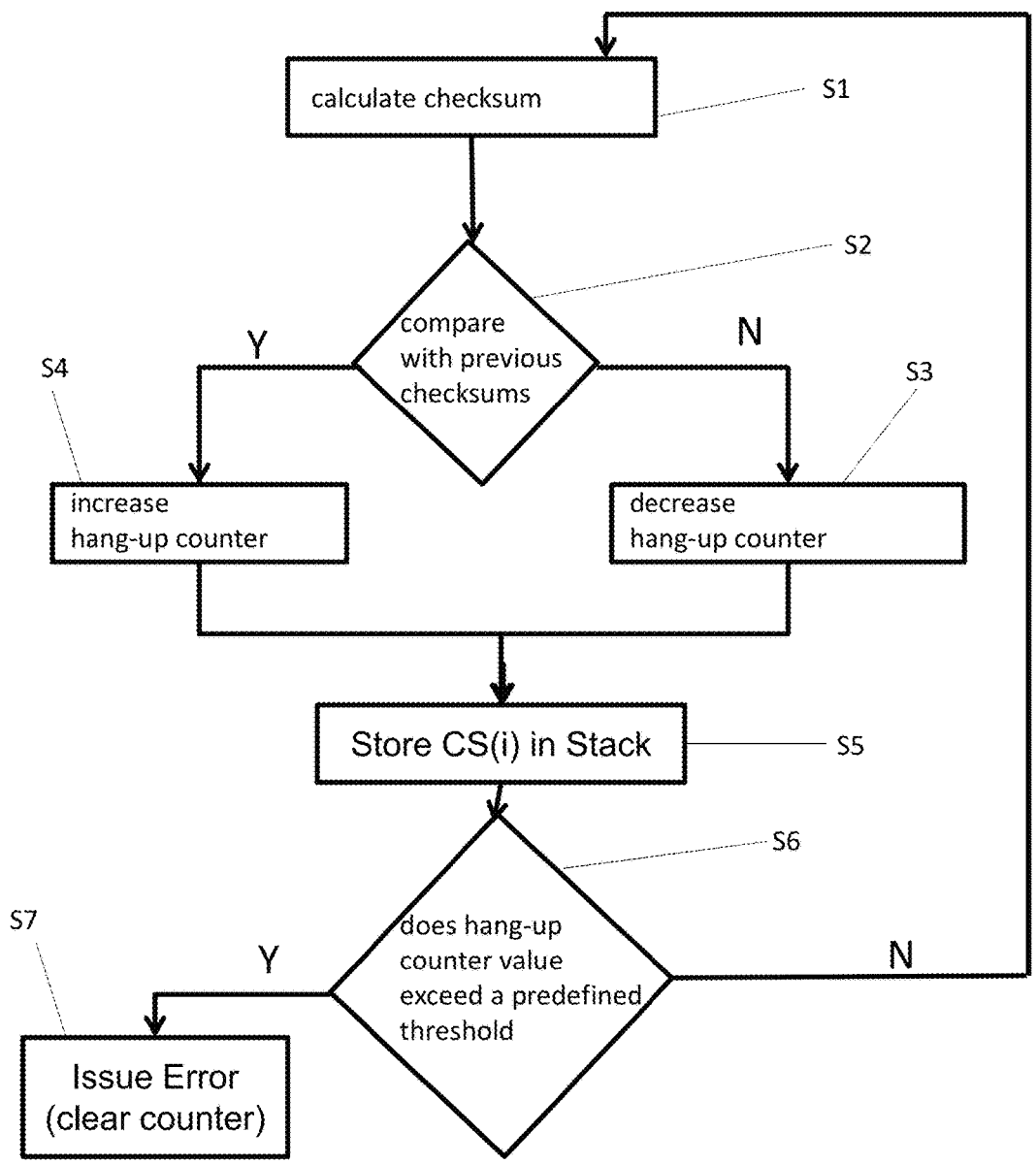
FIG. 3 shows a flow chart of an example of a method of digital video processing.

Referring to FIG. 3, a method for processing and outputting a digital video stream may comprise in one embodiment detecting a fault in the digital video stream. The hang-up detection circuit 14 may for example perform a detection as illustrated in FIG. 3.

In S1 the checksum CS(i) for frame i of the processed digital video stream X2 is calculated.

Next, in S2 the calculated checksum CS(i) is compared with n previous checksums in order to find out whether the compared checksum match with each other (Y) or not (N).

If the result of S2 is "N" then the counter value of the hang-up counter 24 is decreased by a small value, such as "1" (S3). If the result of S2 is "Y" then the counter value of the hang-up counter 24 is increased by a high value, such as "10" (S4). This way a permanent hang-up event can be made visible very effectively. The basic idea underlying this solution is that the typical scenario should be a non-error state where no hang-up is present. Therefore, this non-error scenario is weighted less than a hang-up error state. With the present solution as shown in FIG. 3, the method accommodates these issues as the counter value of the hang-up counter 24 will be not affected very much if for example only one or a few hang-ups are detected. Otherwise, if there is a real hang-up scenario this can be detected more easily since in this case the counter value of the hang-up counter is increased much more that it is decreased by normal non-error scenarios.

In the next S5 the currently compared checksum CS(i) for frame i is stored in the memory stack 21.

Then, in S6, the current counter value of the hang-up counter 24 is compared with a predefined and/or settable and/or programmable threshold in order to find out whether the counter value is higher (Y) than this threshold or not (N).

If the result of this S6 is "N" then obviously no permanent hang-up scenario exists. In this situation the method as shown in FIG. 3 starts again for the next frame i+1 of the processed digital video stream X2.

If however the result of this S6 is "Y" then an error signal X5 can be issued (S7). Further, the hang-up counter 24 can be reset by clearing its counter value.

Figure 4:
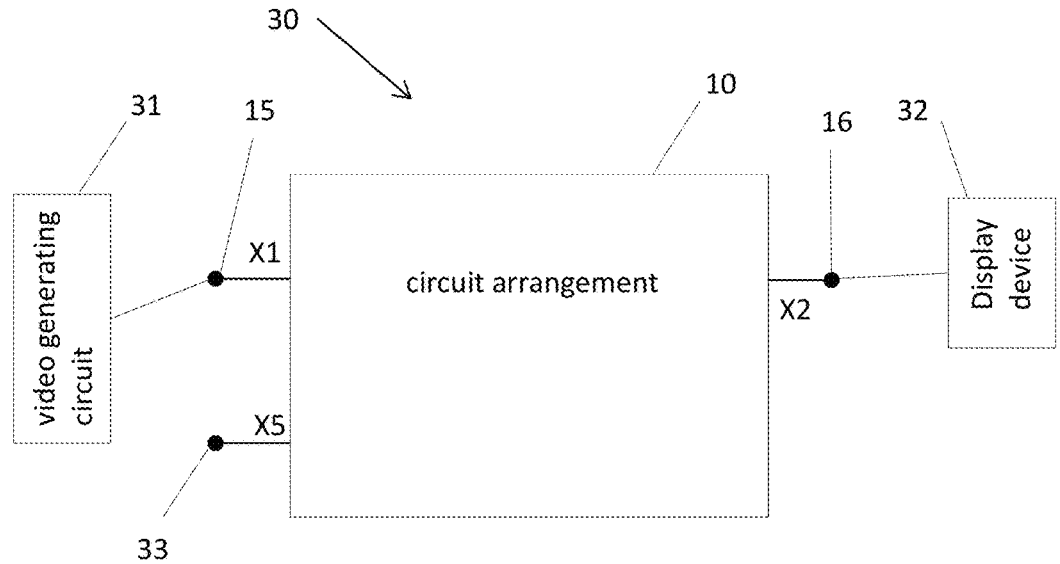
FIG. 4 schematically shows a block diagram of a first example of a digital video system.

FIG. 4 schematically shows a block diagram of an example of a digital video system. The digital video system which is denoted by reference number 30 comprises a circuit arrangement 10 such as shown in FIG. 1 which can be connected via the input terminal 15 with an external video generating circuit 31 and via the output terminal 16 with a display device 32. In this embodiment the video generating circuit 31 can be a camera and the display device 32 can be a monitor. The digital video system 30 further comprises a further output terminal 33 for feeding the error signal X5 to an external device (not shown in FIG. 4), such as an external control apparatus, a service LED, a loud speaker or the like.

Figure 5:
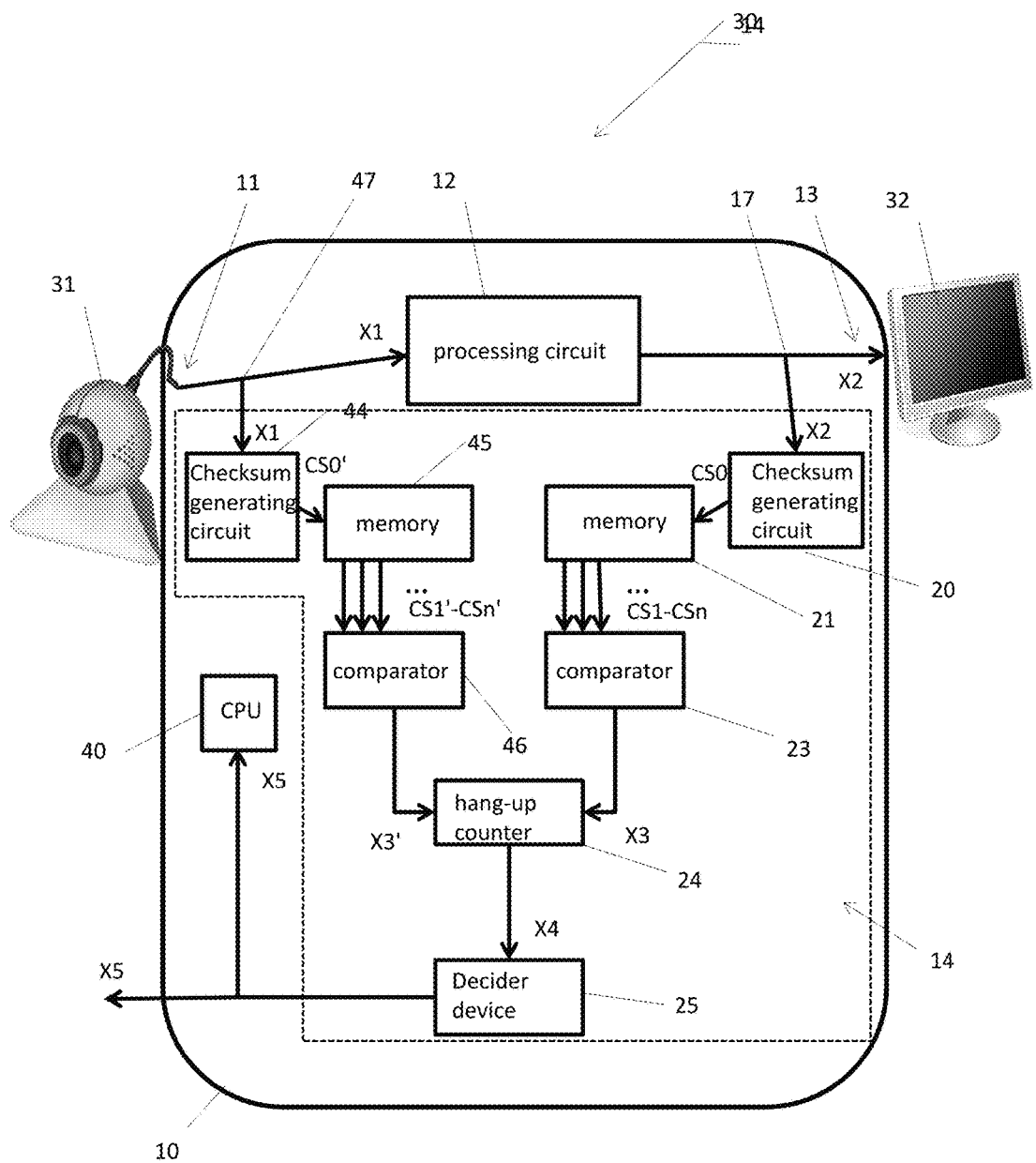
FIG. 5 schematically shows a block diagram of a second example of a digital video system.

FIG. 5 schematically shows a block diagram of an example of a digital video system 30 and a circuit arrangement 10, respectively. Additionally to the circuit arrangement 10 as shown in FIG. 1, 2, the circuit arrangement 10 according to FIG. 5 further comprises an interrupting device 40, which in this embodiment is a central processing unit (CPU) 40. The CPU 40 is a kind of hardware within a computer that is designed to carry out instructions of a computer program by performing the basic arithmetical, logical, and input/output operations of the system. Modern CPUs can be part of a microprocessor, meaning contained on a single chip with further peripheral devices of the respective microprocessor. However, some circuit arrangements or integrated circuits (ICs) can contain multiple CPUs on a single chip. Those ICs are called multi-core processors. An IC containing one or more CPUs can also contain peripheral devices, and other components of a computer system. This is called system on chip (SoC). In the present embodiment, the circuit arrangement 10 may be any kind of circuit arrangement, like e.g. an integrated circuit, a SoC, a microcontroller, a multi-core processor or the like. The interrupting device 40 can be embodied in other units such as monitoring units or the like.

As shown in the example of FIG. 5, the CPU 40 can be connected to the output of the detecting circuit 14 and thus the decider unit 25 in order to receive the error signal X5. Depending on this error signal X5 the CPU 40 can be capable to control operation of the video generating circuit 31, the processing unit 12 and/or the display device 32.

For example, the CPU 40 may initiate a new calibration or a reset of the video generating circuit 31. Another (or additional) measure may be that the CPU 40 deactivates the display device 32 which is in particular preferable for safety critical application in order to avoid that a user relies on a false video information displayed by the display device 32. In other embodiments the display device 32 can be deactivated by other components of the circuit arrangement 10, for example a display controller.

Still another measure could be the deactivation or resetting of the processing unit 12, in particular for those scenarios where the unprocessed digital video stream X1 shows no fault or hang-up, but the processed digital video stream X2 shows such failure. In these cases it can be assumed that the origin of the fault is with in the processing unit 12, for example such as a software failure. Therefore, in these cases resetting of the processing unit 12 makes sense. The processing unit 12 could for example be deactivated or reset by the CPU 40, a monitoring device or the like. In an embodiment where the processing unit 12 is a component of the CPU 40 the processing unit could for example be reset by the operating software of the CPU 40 or a monitoring device external to the CPU 40.

Instead of interrupting or deactivating the video generating circuit 31 and/or the display device 32 it may also be possible to interrupt the input interface 11 and/or output interface 13, respectively.

Further, the circuit arrangement 10 comprises a functionally extended detecting circuit 14. In addition to the circuitry of the analysing device 14 of FIG. 2, the detecting circuit 14 of FIG. 5 comprises a further checksum generating circuit 44, memory 45 and comparing unit 46. Here, the detecting circuit 14 taps as well the processed digital video stream X2 and the unprocessed digital video stream X1. The checksum generating circuit 44 can be connected with a tap 47 between the input interface 11 and the processing unit 12 in order to receive the unprocessed digital video stream X1. This way, the hang-up counter 24 receives a checksum comparison information X3, X3' as well from the comparing unit 46 and from the comparing unit 23 and thus from the unprocessed digital video stream X1 and the processed digital video stream X2. Therefore, the counter value X4 and the corresponding error signal X5 are generated by taking into account as well a possible fault within the unprocessed digital video stream X1 and the processed digital video stream X2.

Figure 6:
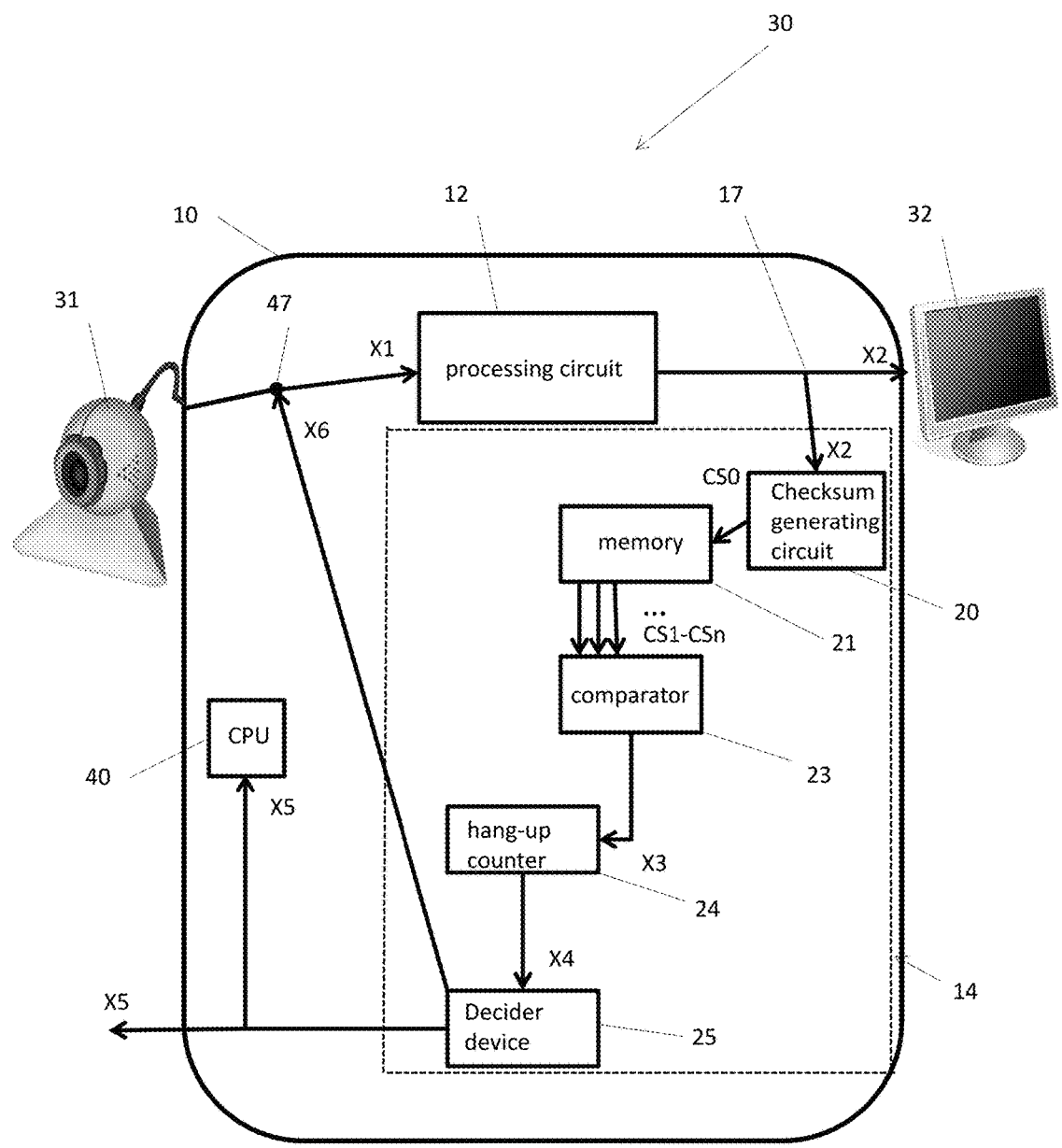
FIG. 6 schematically shows a block diagram of a third example of a digital video system.

FIG. 6 schematically shows a block diagram of an example of a digital video system 30 according to a third embodiment of the invention. In addition to the error signal X5, the decider unit 25 of the detecting circuit 14 provides a LSB signal X6 if the decider device 23 has detected an error. This signal X6 can be forwarded to the tap 47 in order to slightly modify the unprocessed digital video stream X1, which may be done by modifying the LSB bit positions. This way, a slight and known artificial change can be injected into the unprocessed digital video stream X1 and thus the resulting checksum mismatch may be observed. Depending on the number of frames stored in the data path it may take some time until it is observed at the output.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples described.

For instance, unless explicitly stated otherwise, the term "circuit" refers to a logic circuit arranged to perform the functions described. The logic circuit can be either a dedicated, non-configurable or non-programmable, logic circuit or be a logic circuit which has been configured or programmed in a suitable manner, such as for example in case of a video accelerator integrated in a microprocessor.

For example, the connections may be a type of connection suitable to transfer signals from or to the respective nodes, units or devices, for example via intermediate devices. Accordingly, unless implied or stated otherwise the connections may for example be direct connections or indirect connections.

The term "program" or "computer readable program product" as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system or by a CPU of a computer system, like e.g. a microcontroller or a SOC.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, the devices may be physically distributed over a number of apparatuses, while functionally operating as a single device. Devices functionally forming separate devices may be integrated in a single physical device.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as at least one and one or more in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will further be appreciated that certain actions and/or steps in the described method may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study except where specific meanings have otherwise be set forth herein.

LIST OF REFERENCE SIGNS 10 circuit arrangement
11 input interface
12 processing circuit
13 output interface
14 (hang-up) detecting circuit
15 input terminal
16 output terminal
17 tap
18 tap input
20 checksum generating circuit
21 (stack) memory
22 analysing unit
23 comparing unit, comparator
24 hang-up counter
25 decider device
30 digital video system
31 video signal generating circuit, camera
32 display device, monitor, screen
33 output terminal
40 central processing unit, CPU
44 checksum generating circuit
45 (stack) memory
46 comparing unit, comparator
47 tap
CS0 (current) checksum
CS1-CSn stored checksums
S1-S7 method actions
X1 (unprocessed) digital video stream
X2 (processed) digital video stream
X3, X3' information
X4 counter value
X5 error signal
X6 LSB signal

The invention claimed is:

1. A circuit arrangement for processing a digital video stream and for detecting a fault in the processed digital video stream, the circuit arrangement comprising:
   an input interface for receiving an digital video stream, the digital video stream comprises information of a sequence of frames, the sequence of frames including first, second, and third frames;
   a processing circuit which is arranged to process the digital video stream and to provide the processed digital video stream to an output interface; and
   a hang-up detecting circuit for detecting a fault in the processed digital video stream, the hang-up detecting circuit comprising:
      a checksum generating circuit which is arranged to generate a checksum for at least a part of each frame of the sequence including a first checksum for the first frame, a second checksum for the second frame, and a third checksum for the third frame,
      a memory to store a predefined amount of generated checksums including the first, second, and third checksums; and
      an analyzing unit arranged to compare a currently generated checksum of a current frame of the sequence of frames of the processed digital video stream with a plurality of corresponding checksums of preceding frames stored in the memory including the first, second, and third checksums, and to generate an error signal if at least one predefined amount of compared checksums are matching.

2. The circuit arrangement of claim 1, wherein the hang-up detecting circuit comprises a tap input which is connected to the input interface and wherein the tap input is further arranged to tap the digital video stream at the input interface in order to detect a fault in the unprocessed digital video stream.

3. The circuit arrangement of claim 1, wherein the checksum generating circuit is arranged to generate a CRC checksum.

4. The circuit arrangement of claim 1, wherein the checksum generating circuit is arranged to generate a plurality of checksums per frame of the digital video stream, in particular at least four checksums.

5. The circuit arrangement of claim 1, wherein the analysing unit comprises a hang-up counter and a decider, wherein the hang-up counter is arranged to identify the amount of checksums which are matching and wherein the decider is arranged to generate the error signal only if a predefined amount of matched checksums are identified.

6. The circuit arrangement of claim 1, wherein the analysing unit comprises a hang-up counter and a decider, wherein the hang-up counter is arranged to identify a failure in the digital video stream based on the ratio between the number of non-identical checksums and the number of identical checksums and wherein the decider is arranged to generate the error signal only if the ratio exceeds a predefined ratio.

7. The circuit arrangement of claim 1, wherein the analysing unit is coupled with the input interface and is arranged such to perform a modification of the unprocessed digital video signal if at least two compared checksums are matching and/or if an error is detected.

8. The circuit arrangement of claim 1, further comprising an interrupting device which is coupled to the analysing unit in order to receive the error signal and which is arranged to interrupt the functionality of an external video signal generating circuit, the input interface, the processing device and/or the output interface if an error signal is provided to the interrupting device.

9. The circuit arrangement of claim 1, wherein the memory is arranged to store at least one checksum per stored image frame of the generated digital video stream.

10. The circuit arrangement of claim 1, wherein the circuit arrangement is included within a digital video system, in particular an automotive video system, further comprising:
a video signal generating circuit which is coupled to the circuit arrangement and which is arranged to provide a digital video stream to the input interface of the circuit arrangement, and
a display device which is coupled to an output interface of the circuit arrangement and which is arranged to display the digital video stream processed by the circuit arrangement.

11. The video system of claim 10, further comprising an optical and/or acoustical error displaying device which is coupled to an error output terminal of the circuit arrangement and which based on the error signal is arranged to optically and/or acoustically indicate an error condition.

12. The video system of claim 10, wherein the video signal generating circuit is a camera.

13. The video system of claim 10, wherein the video signal generating circuit is a calculation circuit which is arranged to calculate the digital video stream based on a predefined program and/or video data.

14. A method for processing a digital video stream and for detecting a fault in the processed digital video stream, the method comprising:
processing a digital video stream wherein the digital video stream comprising information of an image;
detecting a fault for each frame of a sequence of frames of the processed digital video stream, the sequence of frames including first, second, and third frames, detecting comprising:
generating a checksum for at least a part of each frame of the sequence of frames the processed digital video stream, including a first checksum for the first frame, a second checksum for the second frame, and a third checksum for the second frame,
storing a predefined amount of generated checksums including the first, second, and third checksums in a memory,
comparing a currently generated checksum of a current frame of the sequence of frames of the processed digital video stream with a plurality of corresponding checksums of preceding frames of the same processed digital video stream stored in the memory including the first, second, and third checksums,
generating an error signal if at least a predefined amount of compared checksums are matching.

15. The method of claim 14, further comprising: slightly modifying the unprocessed digital video stream if at least one pair of compared checksums is matching.

16. The method of claim 14, further comprising interrupting the functionality of a video signal generating circuit, an input interface, a processing device and/or an output interface if an error signal is generated.

17. The method of claim 14, wherein the subsequently generating comprises the generation of a plurality of checksums per frame of the processed digital video stream.

18. The method of claim 14, wherein the error signal is generated only if a predefined amount of matched checksums are straight successively identified.

19. A non-transitory computer readable medium comprising a memory device stores instructions which, when executed by a processor cause the processor to:
process a digital video stream wherein the digital video stream comprising information of an image;
detect a fault for each frame of a sequence of frames of the processed digital video stream, the sequence of frames including first, second, and third frames, detecting comprising:
generate a checksum for at least a part of each frame of the sequence of frames the processed digital video stream, including a first checksum for the first frame, a second checksum for the second frame, and a third checksum for the second frame,
store a predefined amount of generated checksums including the first, second, and third checksums in a memory,
compare a currently generated checksum of a current frame of the sequence of frames of the processed digital video stream with a plurality of corresponding checksums of preceding frames of the same processed digital video stream stored in the memory including the first, second, and third checksums,
generate an error signal if at least a predefined amount of compared checksums are matching.

20. The non-transitory computer readable medium of claim 19, wherein the subsequently generate the error signal comprises the generation of a plurality of checksums per frame of the processed digital video stream.

* * * * *